Figure 2:
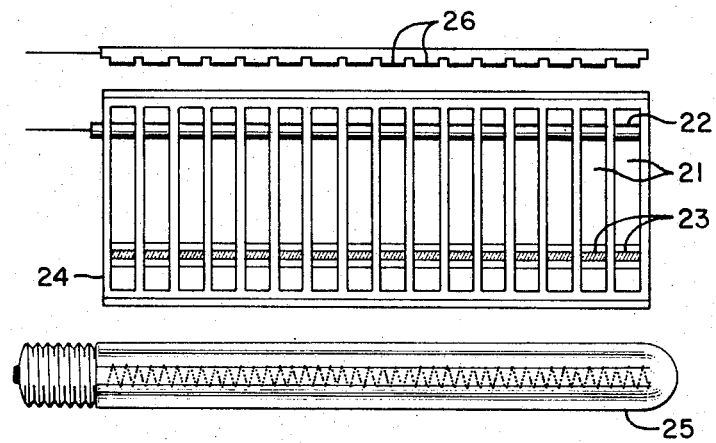

Jan. 9, 1968  W. A. ALEXANDER  3,363,239
ELECTRO-OPTICAL DATA STORAGE AND RETRIEVAL UNIT
Filed Oct. 1, 1962  3 Sheets-Sheet 1

Warren A. Alexander INVENTOR.

BY *Gary C. Honeycutt*

ATTORNEY

Warren A. Alexander INVENTOR.

Jan. 9, 1968  W. A. ALEXANDER  3,363,239
ELECTRO-OPTICAL DATA STORAGE AND RETRIEVAL UNIT
Filed Oct. 1, 1962  3 Sheets-Sheet 3

Warren A. Alexander INVENTOR.

BY *Gary C. Honeycutt*
ATTORNEY

United States Patent Office 3,363,239
Patented Jan. 9, 1968

3,363,239
ELECTRO-OPTICAL DATA STORAGE
AND RETRIEVAL UNIT
Warren A. Alexander, Tulsa, Okla., assignor, by mesne assignments, to Esso Production Research Company, Houston, Tex., a corporation of Delaware
Filed Oct. 1, 1962, Ser. No. 227,247
4 Claims. (Cl. 340—173)

This invention is concerned with the storage and retrieval of data. More particularly, the invention relates to an electrochemical storage of data and photoelectric or optical means for retrieval of the stored data. Specifically, an electro-optical device is provided which stores data by the electrolytic deposition of metal on a transparent electrode and which returns the stored data on demand by means of a photoelectric determination of the extent to which the transparency of the electrode is reduced by electroplating.

One object of the invention is to provide an electrochemical cell which includes light absorption means, the absorptivity thereof being controlled by a reversible electroplating process.

Another object is to provide an electro-optical device which comprises a light source, means for measuring light intensity positioned to intercept light from said source, and variable, reversibly controlled light attenuation means disposed in the path of said light.

Still another object is to provide a multiple array of electrochemical cells having the above-mentioned characteristics, and a multiple array of electro-optical devices embodying such an array of electrochemical cells.

Other objects and advantages of the invention will become apparent from the following description.

In a specific embodiment the device of the invention includes an electrolytic bath in which two electrodes are immersed. The container which holds the bath is chemically inert thereto, and has transparent walls or windows arranged to permit the passage of light rays through the bath. One electrode is transparent, and preferably has a relatively thin, flat shape. It is placed between the transparent walls or windows of the container, whereby light traversing the bath also passes through the electrode. The other electrode is composed of a material which is reversibly electroplatable on the first electrode, and which thereby decreases or increases the degree of transparency of the first electrode.

A light source and a photocell are placed on opposite sides of the bath, whereby light from the source traverses one transparent wall or window of the container, then traverses a portion of the bath, then the transparent electrode, the remainder of the bath, the other wall or window, and ultimately strikes the photocell. If desired, one transparent wall or window of the container, or both, may also serve as the transparent electrode.

Figure 1:
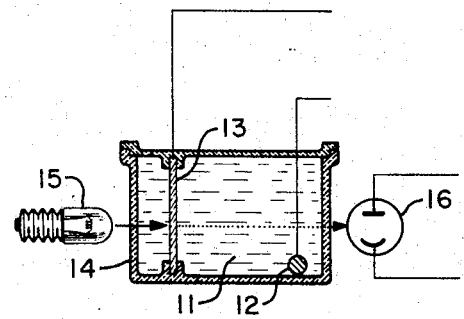

Referring now to FIGURE 1 in detail, the essential elements of the embodiment shown include electrolytic bath 11, electrodes 12 and 13 contained or encased in member 14; light source 15 and photoelectric cell 16. Electrode 12 serves as the anode, and electrode 13 as the cathode while plate is being deposited on electrode 13. The return of plate material to electrode 12 entails a reversal of this polarity, as will readily occur to one skilled in the art.

Photocell 16 may be any of the various types known in the art, including photovoltaic, photoconductive, and photoemissive cells.

Preferably, electrode 12 is a metal such as copper, nickel, or zinc and the essential ingredient of electrolyte bath 11 is a salt, the cation of which corresponds to the metal of electrode 12, such as copper sulfate, nickel chloride or zinc cyanide, respectively. Electrode 13 is a transparent, conductive material, examples of which include certain glasses and plastics. An example of material suitable for use as electrode 13 is the electrically conducting (E.C.) coated glass produced by Corning Glass Works of Corning, N.Y. Typical of the E.C. glasses are Pyrex brand 7740 and 1723, as described in Corning Product Information Bulletin IC-35. The conductive coatings are films of metallic oxides fired into the glass surface. The transparency of the glass is only slightly reduced by the oxide coating.

Although electrode 13 in the embodiment shown is transparent, it is nevertheless within the scope of the invention to employ any material which transmits light of substantial intensity prior to receiving any plate from electrode 12, and which increases substantially in light absorptivity upon acquiring a relatively thin coat of the electroplate material. For example, in one embodiment electrode 13 is a metal screen the light transmissibility of which is dependent upon the size of the openings therein. An electrode screen having very small openings is readily made less transparent, and ultimately opaque upon acquiring increased amounts of an electroplated coating.

A substantially modified embodiment utilizes a reflecting electrode, such as a polished metal mirror. Incremental electro-deposition of a metallic coating thereon dulls the surface, thereby reducing the intensity of reflected light, as measured by a series of photocells located in a position to intercept the reflected light.

A further modification of the embodiment which employs a reflecting electrode involves the use of an electrode which is initially non-reflecting, such as carbon or graphite, and electroplating thereon a metal which forms a lustrous plate, such as chromium, cadmium or nickel.

The walls of container 14 are preferably completely transparent and must be chemically inert with respect to the electrolyte solution. Light source 15 and photoelectric cell 16 are of any conventional design and are disposed such that light intercepted by the photocell first passes through electrode 13.

In operation, the value to be stored is supplied to the electrodes in the form of a direct current, with electrode 12 assuming positive polarity, and electrode 13 negative polarity, in accordance with conventional electrochemical laws. The thickness of the layer electroplated upon cathode 13 is directly proportional to the total flow of current through electrolytic bath 11. Accordingly, the value represented by the electric current supplied to the device is now converted into an electroplate on cathode 13 which may be permanently stored in accordance with the object of the invention. At some later time, whenever desired, this value may be again converted to a voltage or other electrical value by photocell 16, depending on which type of photocell is used, in its capacity to measure the light transmitted through cathode 13 from light source 15.

For the purposes of this disclosure "transparent" is employed in a relative sense, and is intended to include light transmission of any substantial intensity, regardless of whether or not the light rays are diffused or otherwise attenuated upon passing through the particular cathode or other material to which the property is ascribed. Accordingly, a material which is translucent is also "transparent" within the scope of the term as employed herein.

FIGURE 2 is a top view of an embodiment of the invention wherein a plurality of units such as illustrated in FIGURE 1 are arranged in a side-by-side relationship. Container 24 is subdivided into a plurality of compartments each of which contains an electrolytic bath 21 and a separate electrode 23. Electrode 22, however, may be a continuous strip or bar extending throughout the entire series of compartments. A single elongated light source 25 is adequate to supply the necessary illumination for the entire series of cells. A series of photoelectric devices 26 are arranged in alignment with the individual cells 21 whereby each photocell receives light transmitted by only the one electrochemical cell with which it is aligned. An example of a multiple array of photocells is the Silicon Photocell Readout Matrix, described in Bulletin SR–278–A of International Rectifier Corporation, El Segundo, Calif.

In this embodiment a series of independent signals may be simultaneously recorded and permanently stored. The stored data may then be reconverted into electrical values by the series of photocells 26 in response to the intensity of light transmitted through the individual cells from the source 25. The individual terminals or leads running from each cathode 23 and from each photocell 26 are not shown in the drawing.

Figure 3:
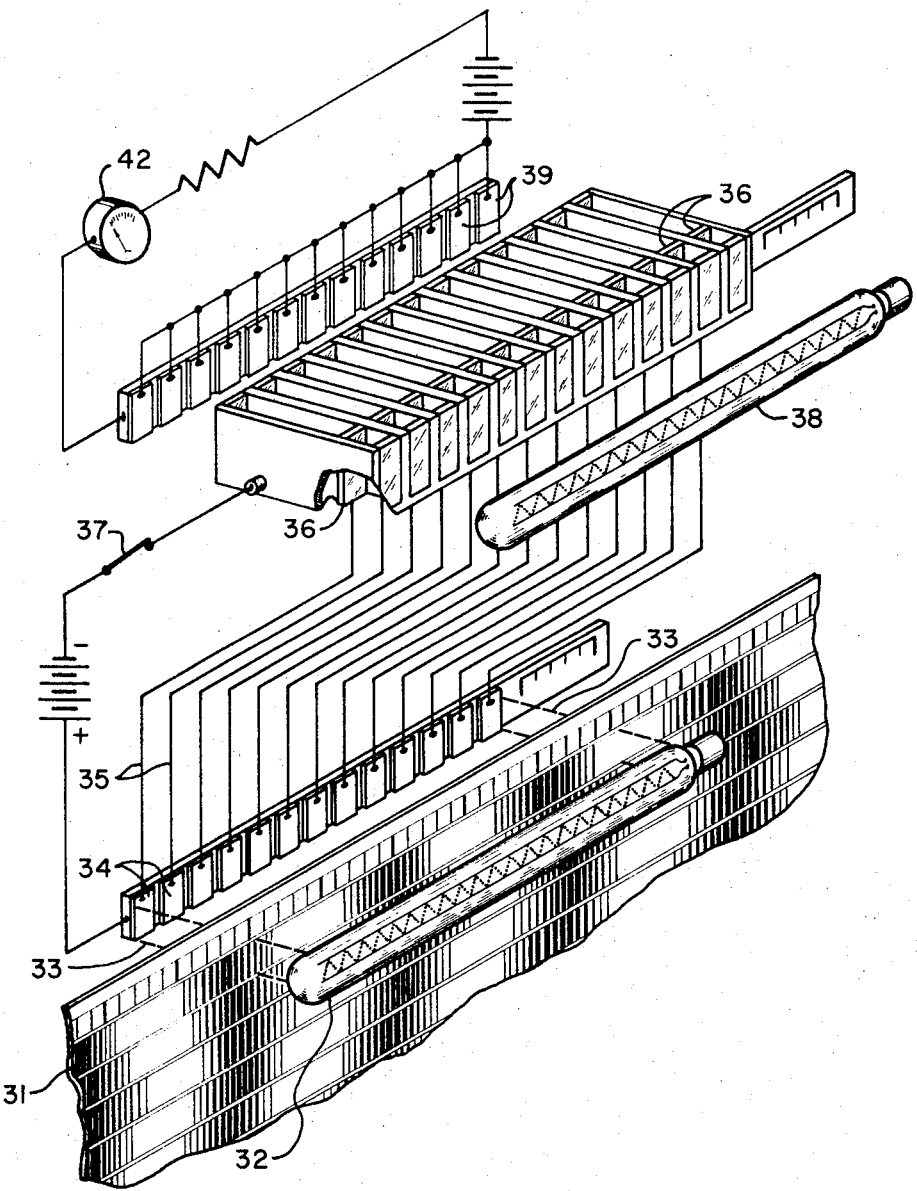

FIGURE 3 illustrates one application of the multiple unit apparatus illustrated in FIGURE 2. In the art of seismic prospecting subterranean geological features are explored by a conventional technique which involves the preparation of a seismic section. One of the final steps in preparing a multiple trace variable density seismic section is to align the individual traces in the proper side-by-side relationship. This is accomplished utilizing the device of the present invention by first positioning an individual trace 31 in path 33 of light traveling from source 32 to photocells 34. The intensity of light which strikes each unit of the series of photocells 34 is inversely proportional to the amount of light absorbed by that particular interval of the seismic trace which lies opposite the given cell. The fraction of total current carried by each of lines 35 is determined by the intensity of light striking the respective photocells, which in turn controls the amount of metal electroplated on each of the transparent cathodes 36. This is the "adapt" cycle of the operation, whereby the information stored in the seismic trace is converted or adapted by electroplating. Switch 37 is closed during this part of the process. The function of light source 38 and photocells 39 will be made clear by consideration of the next figure.

Figure 4:
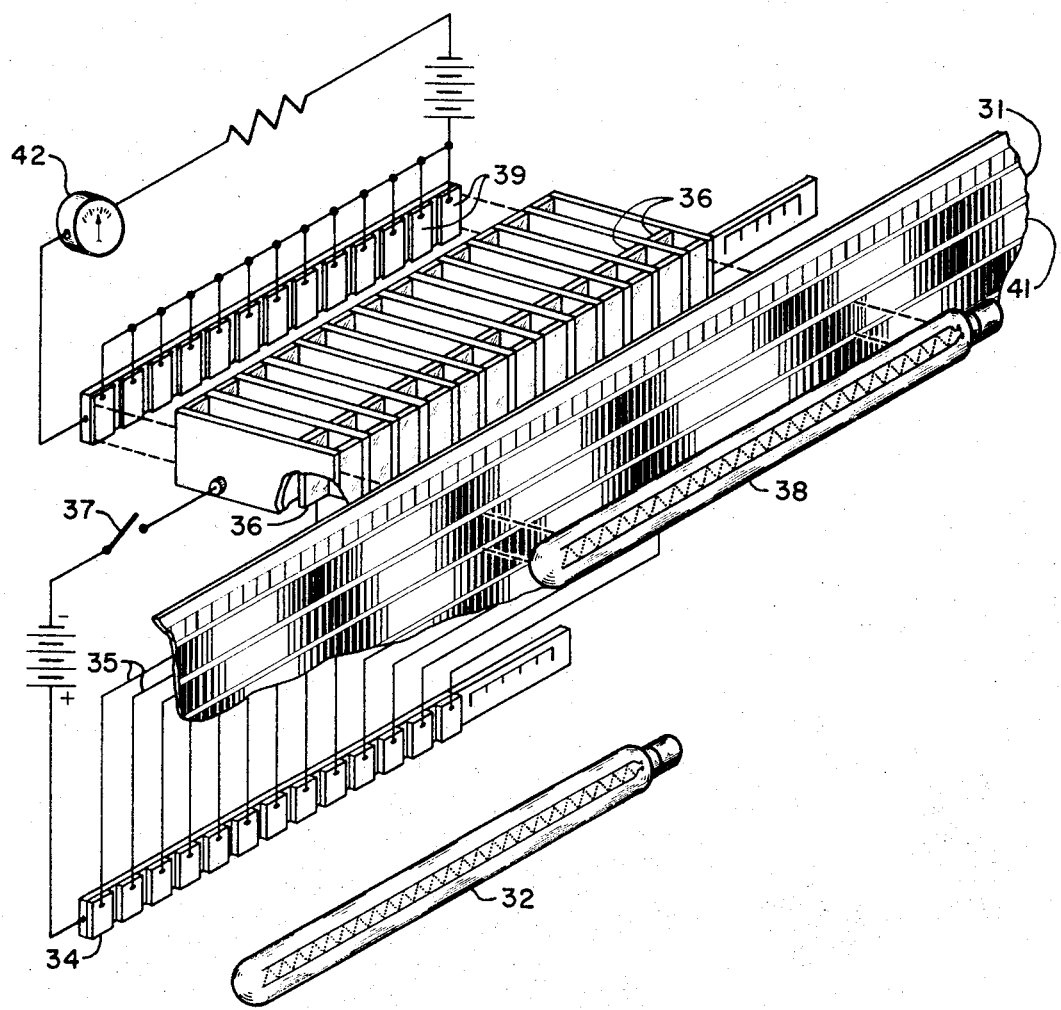

In FIGURE 4 the read-out cycle of the operation is illustrated. Seismic trace 41, adjacent trace 31, is placed in the path of light traveling from source 38 to photocells 39. Electroplated cathodes 36 also lie in the same path, whereby light striking photocells 39 is attenuated first by the density of seismic trace 41 and then by the metal coating of each cathode 36.

In this phase of the operation a positioning of trace 41 is sought with respect to trace 31 whereby the events thereon indicative of a single subsurface reflection layer lie in exact alignment. In this regard it will be remembered that the density of the electroplate on cathodes 36 is inversely proportional to the density of events on trace 31. Therefore a matching of trace 41 with cathodes 36 which corresponds most nearly to the desired alignment will register a minimum response in each of photocells 39, which in turn minimizes the net flow of current through meter 42. Thus a visual reading of ammeter 42 leads the operator to select that position of trace 41 which corresponds to a minimum reading on meter 42. Switch 37 is open during this part of the process.

The matching of trace 41 with a single trace adjacent thereto is only the simplest application of the technique herein disclosed. A somewhat more complicated application of the idea involves the cumulative adaptation during the plating cycle of a plurality of individual traces whereby the resulting stored information is a composite of the individual traces. Then an additional trace is matched with the stored composite information in order to secure a more general alignment of the individual trace with a plurality of adjacent traces, as opposed to the described alignment with a single trace.

Numerous other embodiments and applications of the invention will readily occur to those skilled in the art. Accordingly, it is intended that no limitation be imposed on the scope of the invention other than as recited in the appended claims.

I claim:
1. An electro-optical data storage and retrieval unit comprising an electrolytic bath, a container holding said bath, two electrodes immersed in said bath, the first of said electrodes being transparent, and the second of said electrodes comprising a substance which is reversibly electroplatable on said first electrode and which, when electroplated thereon, renders said first electrode less transparent; a source of direct current and a photoconductive cell connected in series with said immersed electrodes; first and second light sources, said first light source disposed in a position to impinge upon said photoconductive cell, and means for measuring light intensities disposed in a position to intercept light from said second source after passage thereof through said first electrode.

2. A unit as defined by claim 1 wherein said first electrode comprises electrically conductive glass.

3. A unit as defined by claim 1 wherein said first electrode comprises a metallic screen.

4. Data storage and retrieval apparatus comprising first and second elongated light sources; a first multiplicity of photoconductive cells, each being positioned to receive light of substantially the same intensity from said first light source; a second multiplicity of photoconductive cells, each being positioned to receive light of substantially the same intensity from said second light source; a multiplicity of electrolytic cells, corresponding in number to said second multiplicity of photoconductive cells, each of said electrolytic cells being disposed between said second light source and a corresponding photoconductive cell; each of said electrolytic cells comprising an electrolytic bath, a container holding said bath, two electrodes immersed in said bath, the first of said electrodes being transparent and the second of said electrodes comprising a substance which is reversibly electroplatable on said first electrode and which, when the electroplated thereon, renders said first electrode less transparent; each of said electrolytic cells being electrically connected in series with a corresponding photoconductive cell of said first multiplicity and each of said electrolytic cell-photoconductive cell combinations being electrically connected across the terminals of a direct current source; said second multiplicity of photoconductive cells being connected in parallel across the terminals of a second D.C. source in combination with means for indicating the aggregate conductivity of said second multiplicity of photoconductive cells in response to the aggregate attenuation of the light passing from said second light source to said second multiplicity of photoconductive cells by said multiplicity of electrolytic cells.

References Cited

UNITED STATES PATENTS

| 1,525,554 | 2/1925 | Jenks | 88—61 |
| 3,035,479 | 5/1962 | Baltosser et al. | 88—14 |

FOREIGN PATENTS

| 1,228,105 | 3/1960 | France. |
| 241,636 | 10/1925 | Great Britain. |

JEWELL H. PEDERSEN, *Primary Examiner.*

R. L. WIBERT, *Assistant Examiner.*